United States Patent
Krings et al.

(10) Patent No.: US 12,163,559 B2
(45) Date of Patent: Dec. 10, 2024

(54) CONSTANT VELOCITY JOINT

(71) Applicant: NEAPCO INTELLECTUAL PROPERTY HOLDINGS, LLC, Farmington, MI (US)

(72) Inventors: Dominik Krings, Heimbach-Vlatten (DE); Juan Agustin Aristondo Arrizabalaga, Zarautz Gipuzkoa (ES)

(73) Assignee: NEAPCO INTELLECTUAL PROPERTY HOLDINGS, LLC, Farmington, MI (US)

( * ) Notice: Subject to any disclaimer, the term of this patent is extended or adjusted under 35 U.S.C. 154(b) by 448 days.

(21) Appl. No.: 17/433,484

(22) PCT Filed: Feb. 27, 2020

(86) PCT No.: PCT/EP2020/055153
§ 371 (c)(1),
(2) Date: Aug. 24, 2021

(87) PCT Pub. No.: WO2020/174050
PCT Pub. Date: Sep. 3, 2020

(65) Prior Publication Data
US 2022/0170513 A1    Jun. 2, 2022

(30) Foreign Application Priority Data
Feb. 28, 2019 (DE) ................ DE102019105195.9A (51) Int. Cl.
*F16D 3/223*     (2011.01)
*F16D 3/2233*    (2011.01)
(Continued)

(52) U.S. Cl.
CPC ........ *F16D 3/2237* (2013.01); *F16D 3/2233* (2013.01); *F16D 3/224* (2013.01); *F16D 2003/22303* (2013.01); *Y10S 464/906* (2013.01)

(58) Field of Classification Search
CPC ...... F16D 3/2237; F16D 3/2233; F16D 3/224; F16D 2003/22303; Y10S 464/906
(Continued)

(56) References Cited

U.S. PATENT DOCUMENTS 7,621,816 B2 * 11/2009 Weckerling ............... F16D 3/38
                                                         464/145
9,169,877 B2 * 10/2015 Hirukawa ................. F16D 3/24
(Continued)

FOREIGN PATENT DOCUMENTS

| DE | 112006004069 | 7/2009 |
| DE | 10337612 | 11/2009 |

(Continued)

OTHER PUBLICATIONS

International Search Report and Written Opinion of International Searching Authority for PCT/EP2020/055153, ISA/NL, Rijswijk, Netherlands, Dated: Apr. 20, 2020.

*Primary Examiner* — Greg Binda
(74) *Attorney, Agent, or Firm* — M&B IP Analysts, LLC (57) ABSTRACT

A constant-velocity joint for torque-transmission, in which a first type of track pairs of ball tracks is configured in such a manner that the centers of curvature of the center lines of the ball tracks are situated in the joint center plane when the joint is straight. A second type of track pairs of ball tracks is configured in such a manner that their center lines have at least two portions. The respective center line of the outer ball tracks of the second type of track pairs has at least one inner portion and one outer portion, wherein the inner portion is situated on the connection side of the outer joint portion, (Continued)

while the outer portion is situated on the opening side of the outer joint portion, and the inner portion is curved.

13 Claims, 6 Drawing Sheets

(51) Int. Cl.
  *F16D 3/2237* (2011.01)
  *F16D 3/224* (2011.01)
(58) Field of Classification Search
  USPC .......................................................... 464/145
  See application file for complete search history.

(56) References Cited

U.S. PATENT DOCUMENTS

| | | | |
|---|---|---|---|
| 10,364,849 | B2 | 7/2019 | Nishiyama et al. |
| 2011/0212789 | A1 | 9/2011 | Ooba et al. |
| 2014/0243104 | A1 | 8/2014 | Yamazaki et al. |

FOREIGN PATENT DOCUMENTS

| | | |
|---|---|---|
| DE | 102004006225 | 11/2009 |
| WO | 2006048032 A1 | 5/2006 |
| WO | 2008043384 A1 | 4/2008 |

* cited by examiner

CONSTANT VELOCITY JOINT

TECHNICAL FIELD

The present disclosure relates generally to a constant-velocity rotary joint for torque transmission.

BACKGROUND

A constant-velocity rotary joint is a mechanical coupling connecting two shafts, wherein the rotation speed of an output shaft is equal to the rotation speed of an input shaft, irrespective of the bending angle of the joint. A constant-velocity rotary joint in this case comprises an outer joint portion with several outer ball tracks, an inner joint portion with several inner ball tracks, and torque-transmitting balls, which are each guided in track pairs of outer ball tracks and inner ball tracks. Further, a cage is provided, which accommodates the balls in cage windows and retains them in a common joint center plane when the constant-velocity rotary joint is straight. When the joint is angled, the cage retains the balls in the homokinetic plane (angle bisector). In this case, a spherical outer surface of the cage rests, with clearance, against a spherical inner surface of the outer joint portion, while a spherical inner surface of the cage rests, with clearance, against a spherical outer surface of the inner joint portion, in order thus to enable the cage to pivot freely between the two joint portions.

SUMMARY

Against this background, it was the object of the present disclosure to provide a constant-velocity rotary joint in which the ratio of the torque transmission to the structural volume is as large as possible, and which is improved particularly with respect to the smooth running and the degree of efficiency. Particularly at large joint angles (above 50°, e.g. 54°), it is supposed to be possible to transmit as large a torque as possible.

The constant velocity joint according to the present disclosure comprises a, usually cup-shaped, outer joint portion, which has a first longitudinal axis and, situated axially opposite each other, a first connection side and an opening side, and which has outer ball tracks on its inner circumferential surface. For example, the connection side is configured as a shaft journal or for accommodating a shaft journal. The constant velocity joint further includes an inner joint portion, which has a second longitudinal axis and inner ball tracks on its outer circumferential surface. The inner joint portion is usually inserted into the hollow volume formed by the outer joint portion. According to the present disclosure, several balls are provided for torque transmission between the outer joint portion and the inner joint portion. It is not compulsory, but preferred, that these are balls with identical dimensions. According to the present disclosure, a ball cage is also provided, which is disposed between the inner joint portion and the outer joint portion, with several cage windows distributed in a circumferential direction, in which the balls are guided. In particular, the cage is configured with an annular shape.

The inner joint portion and the outer joint portion are disposed in such a way that one outer ball track of the outer joint portion and one inner ball track of the inner joint portion are in each case located opposite each other, forming a track pair, wherein one of the balls is accommodated in each track pairing. The possible path of the centers of the balls in the ball tracks of one track pair is in each case defined as a center line of the respective ball track. In this case, if the joint is bent, a ball runs in each case along one or several outer contact lines in the outer ball track, and along one or more inner contact lines in the inner ball track. A ball contact line, hereinafter also referred to as a contact line in short, may in this case extend along the respective track bottom, but also along the two flanks or one of the flanks. For example, the cross section of the ball tracks may be gothic or elliptical, or correspond to a partial circle. The movement carried out by the balls in the ball tracks will hereinafter be described based on their respective center lines that describe the rolling movement of the ball center of a ball rolling on the respective ball track, and thus, the statements regarding the respective center line apply, mutatis mutandis, to the contact line, while neglecting a required clearance for the balls.

Thus, an outer and an inner center line of a ball track are provided, which ultimately reflect the rolling behavior of the balls determined by the geometry of the ball track. The center lines of the outer and inner ball tracks of a track pair are matched to one another in such a way that they are substantially mirror-symmetrical with respect to the joint center plane when the joint is straight. This applies when neglecting the clearance between the movable joint partners required in practice. However, intended slight deviations from mirror symmetry are also possible.

The constant-velocity rotary joint according to the present disclosure has different types of track pairs of ball tracks in which these center lines are configured differently. According to the present disclosure, it is provided that a first type of track pairs of ball tracks is configured in such a manner that the centers of curvature of the center lines of the ball tracks are situated in the joint center plane when the joint is straight. Thus, these are at least partially concentrically extending ball tracks which have a large wrap angle across the entire bending angle range, thus achieving a high level of torque transmission.

Furthermore, a second type of track pairs of ball tracks is configured in such a manner that their center lines have at least two differently configured portions. In this case, the respective center line of the outer ball tracks of the second type of track pairs has at least one inner portion and one outer portion, wherein the inner portion is situated on the connection side of the outer joint portion, while the outer portion is situated on the opening side of the outer joint portion. The inner portion is curved, and the center of curvature of this inner portion, when the joint is straight, is situated within the hollow volume of the outer joint portion, offset from the joint center plane towards the opening side, while the center line widens through the outer portion towards the opening side.

In order for the center line to widen towards the opening side, the outer portion may be configured in different ways. In one embodiment, the center line widens in a linear manner, e.g. through the outer portion. Another embodiment provides that the at least two portions of the center line are curved in opposite directions. In particular, the center of curvature of the outer portion is situated outside the hollow volume of the outer joint part. In this case, it is preferably also situated offset from the joint center plane, in particular offset towards the opening side. Thus, an S-shaped course of the ball tracks is formed in the second type of track pairs.

The opening angle $\alpha$ of the second type of track pairs opens towards the opening side of the outer joint portion. In this case, the opening angle is defined as the angle between tangents to a ball in the contact points of the latter with the ball tracks. Thus, the ball tracks of the second type of track pairs are configured in such a way that the balls are steered into the plane of symmetry by the shape of their ball tracks when the joint is bent. For this purpose, the center of curvature of at least one portion of the ball tracks is not situated in the plane of symmetry of the joint but offset therefrom. Balls controlled in this manner are advantageous in order to ensure sufficient control of the balls in the joint at small bending angles. Though this results in the wrap angle in the outer region of the ball tracks being only small during operation at large bending angles, particularly above 50°. In addition to such balls with a control function, however, the above-described balls are also used in at least partially concentrically extending ball tracks according to the present disclosure. These neutral balls, as it were, do not subject the cage to an axial load and have a large wrap angle across the entire bending angle range. By combining the two types of ball tracks, the advantages of both ball tracks can be utilized. Thus, the insufficient degree of wrap and the low mechanical stability of the controlling track pairing of the second type in the bent state of the joint can thus be compensated by the first type of neutral track pairs.

At the same time, the widening, in particular the S-shape, of the second type of ball tracks, which is provided according to the present disclosure, permits a greater bending of the joint than is the case for ball tracks that have only a single curved portion whose center is offset from the joint center plane. The balls moving towards the joint opening when the joint is bent can still be guided in the ball tracks across a larger bending range and can contribute to torque transmission.

On the whole, the ratio of torque transmission capacity and construction space can thus be maximized in a constant-velocity rotary joint with a large bending angle. The friction losses between the components are reduced by the axial force neutrality of the balls in the first type of track pairs (neutral balls). These balls are subject to a pure rolling motion. The cage (and thus also the homokinetic plane of the balls) is controlled at small bending angles by the balls in the second type of track pairs (controlled balls). As the bending angle increases, the neutral balls, due to their ball tracks being intertwined, also partially support the control during bending. An early release of the ball while moving at high bending angles is acceptable due to the high number remaining in engagement.

The curvature radiuses of the center lines of the various ball tracks are chosen accordingly. In one embodiment, in the case of the center line of an outer ball track of the second type of track pairs, the ratio of a curvature radius of the inner portion to the diameter $D_{Kugel}$ of an associated ball is between 1.5 and 2.5, for instance. For such a center line, moreover, the ratio of a curvature radius of the outer portion to the diameter $D_{Kugel}$ of an associated ball is between 1.0 and 10, for instance. In another embodiment, the ratio of a curvature radius of the center lines of the first type of track pairs to the diameter $D_{Kugel}$ of an associated ball is between 1.5 and 2.5, for instance.

Preferably, an equal number of track pairs of both types is provided and the track pairs of the two types alternate across the circumference. In particular, the number of balls is even for this reason, so that neutral and controlled balls are disposed in an alternating manner. Preferably, the number of balls is at least eight or exactly eight. Thus, four controlled balls and four neutral balls can be respectively disposed at an angle of about 90° relative to one another. At least three controlled balls in such an arrangement permit a reliable controlling of the joint. Therefore, there is also the option of providing a total of six balls, i.e. alternately three neutral balls in track pairs of the first type and three controlling balls in track pairs of the second type.

In one embodiment, the oppositely curved portions of the center lines of the ball tracks of the second type of track pairs have further portions that follow these curved portions. Thus, this need not be a pure S-shape of the ball tracks, but the S-shape may rather be formed by more than two portions with different curvatures. These further portions may be formed in a linear or curved manner.

The orientation of the ball tracks with respect to the associated longitudinal axis of a joint portion may be different. An oblique positioning of the ball tracks relative to the longitudinal axis is conceivable, wherein the oblique positioning of the inner center lines is, for example, opposite to that of the outer center lines, so that the joint could qualify as belonging to the cross groove joint type. Preferably, however, the ball tracks are respectively disposed in radial planes. Moreover, the joint according to the present disclosure may be designed as a fixed joint or slip joint.

According to an embodiment, it is provided that, for the second type of the track pairs and for an associated ball moving along the course of the respective outer and inner center lines, the associated opening angle α maintains the respective overall direction of its opening if the joint is maximally bent and rotating. In other words: For the second type of the track pairs, the associated opening angle opens towards the opening side of the outer joint part for all possible positions of the intersection point of the outer and inner center lines defining the possible position of the ball, which positions, however, are fundamentally dependent on the bending position of the joint.

According to another embodiment, it is furthermore provided that the radius of the neutral outer ball tracks also widens towards the opening side. The neutral ball tracks are in that case not formed by a single concentrically disposed radius, but these ball tracks, too, can additionally have at least one portion with another opposite radius of curvature. Consequently, an embodiment provides that the first type of track pairs of ball tracks is configured in such a way that the respective center line of the outer ball tracks of this first type of track pairs has at least one inner portion and one outer portion, wherein the inner portion is situated on the connection side of the outer joint portion, while the outer portion is situated on the opening side of the outer joint portion. In that case, the center of curvature of the inner portion is situated in the joint center plane, while the center of curvature of the outer portion is outside the outer joint portion. In another embodiment, the concentric curvature may also widen in a linear manner, or the center of curvature of the widening portion is situated offset from the joint center plane within the hollow volume of the outer joint portion.

Other advantages, special features and expedient further developments of the present disclosure are apparent from the dependent claims and the following presentation of preferred embodiments with reference to the illustrations.

DETAILED DESCRIPTION

Figure 1:
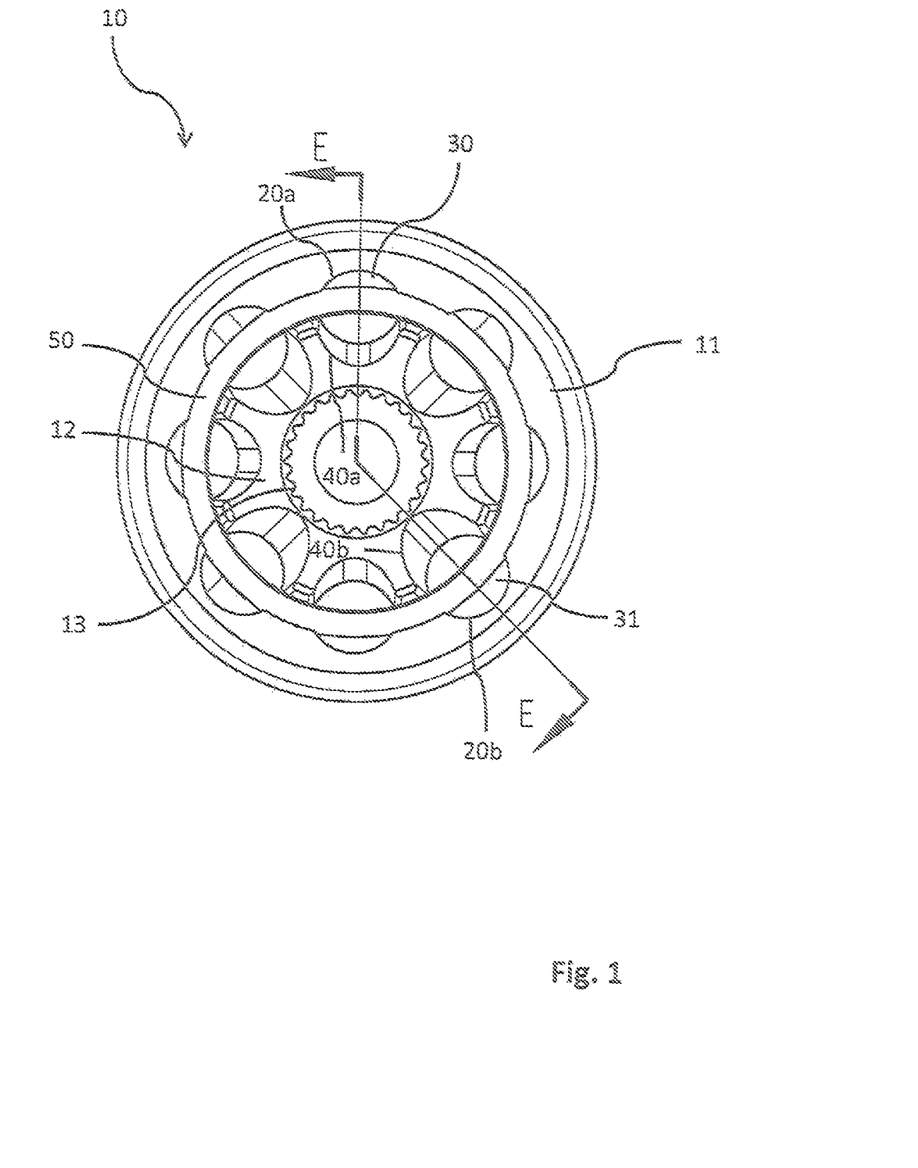
FIG. 1 shows a front view onto the opening side of an embodiment of the constant-velocity rotary joint according to the embodiment in the straight position.
Figure 2:
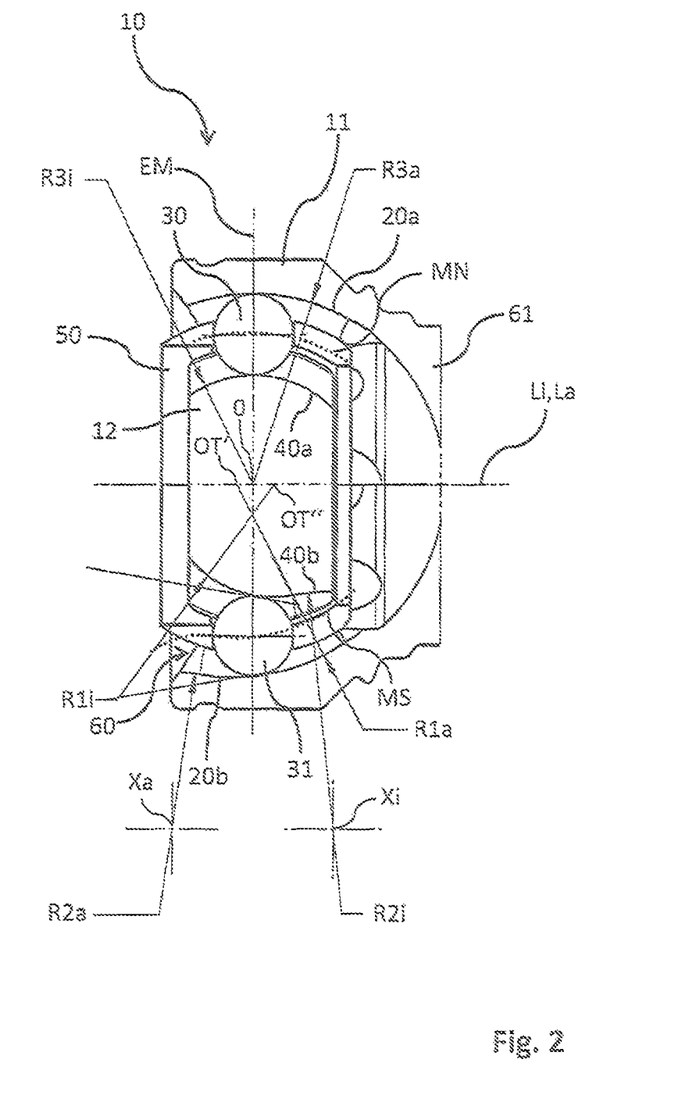
FIG. 2 shows a sectional view of the embodiment of FIG. 1 along the section line E-E.

An embodiment of the constant-velocity rotary joint 10 according to the embodiment is shown in FIG. 1 and the associated longitudinal section E-E along the two longitudinal axes La, Li of the joint of FIG. 2. It has a cup-shaped outer joint portion 11 and an inner joint portion 12. A number of eight balls with an identical diameter, of which two balls are denoted with the reference numerals 30 and 31 by way of example, are disposed between the outer joint portion 11 and the inner joint portion 12. These balls are, on the one hand, guided in outer ball tracks 20a, 20b and, on the other hand, in inner ball tracks 40a, 40b, wherein, also, only the associated ball tracks are given reference numerals. The outer ball tracks 20a, 20b are formed on an inner circumferential surface of the outer joint portion 11 and extend from an opening side 60 towards a connection side 61 of the outer joint portion 11. The outer joint portion 11 forms a shaft journal (not shown), for example, at its connection side 61.

The inner joint portion 12 inserted into the hollow volume formed by the outer joint portion 11 respectively forms inner ball tracks 40a, 40b, which are opposite, in pairs, to the outer ball tracks 20a, 20b, accommodating one ball 30, 31 in each case. The inner joint portion 12 forms an axle-accommodating portion 13, for example, which is not shown in FIGS. 2, 5, 6, however, for the purpose of simplification. If used as intended, the outer joint portion 11 rotates about a first longitudinal axis La, and the inner joint portion 12 correspondingly rotates about a second inner joint portion Li. Due to the ball tracks being shaped differently, particularly in the axial direction, all pairings of an outer ball track 20a, 20b and an inner ball track 40a, 40b formed by their being situated opposite each other in space can be divided into two types of track pairs, which are hereinafter referred to as the first type of track pairs 20a, 40a and as the second type of track pairs 20b, 40b. The balls disposed in the respective type of track pairs are referred to in a different manner only due to this association, and not due to a difference in design, wherein the ball associated with the first type of track pairs 20a, 40a is denoted 30, and the ball associated with the second type of track pair 20b, 40b is denoted 31.

The balls 30 are neutral balls in track pairs whose ball tracks have a center of curvature situated in the joint center plane EM when the joint is straight. The balls 31 are controlled balls in track pairs whose ball tracks consist of at least two portions curved in opposite directions, wherein the inner portion of an outer ball track 20b is situated offset from the joint center plane EM towards the opening side 60. Another portion widens towards the opening side 60 with a radius running in the opposite direction.

The track pairs of one type do not differ, and, per type, are uniformly distributed in the circumferential direction; in this case, they are arranged offset from each other by 90° on the inner circumferential surface of the outer joint portion 11 or the outer circumferential surface of the inner joint portion 12. The types of track pairs are disposed in an alternating manner across the circumference. Therefore, there is an angle of 45° between track pairs of different types. Thus, the section E-E extends through a neutral ball 30 and a controlled ball 31.

Figure 5:
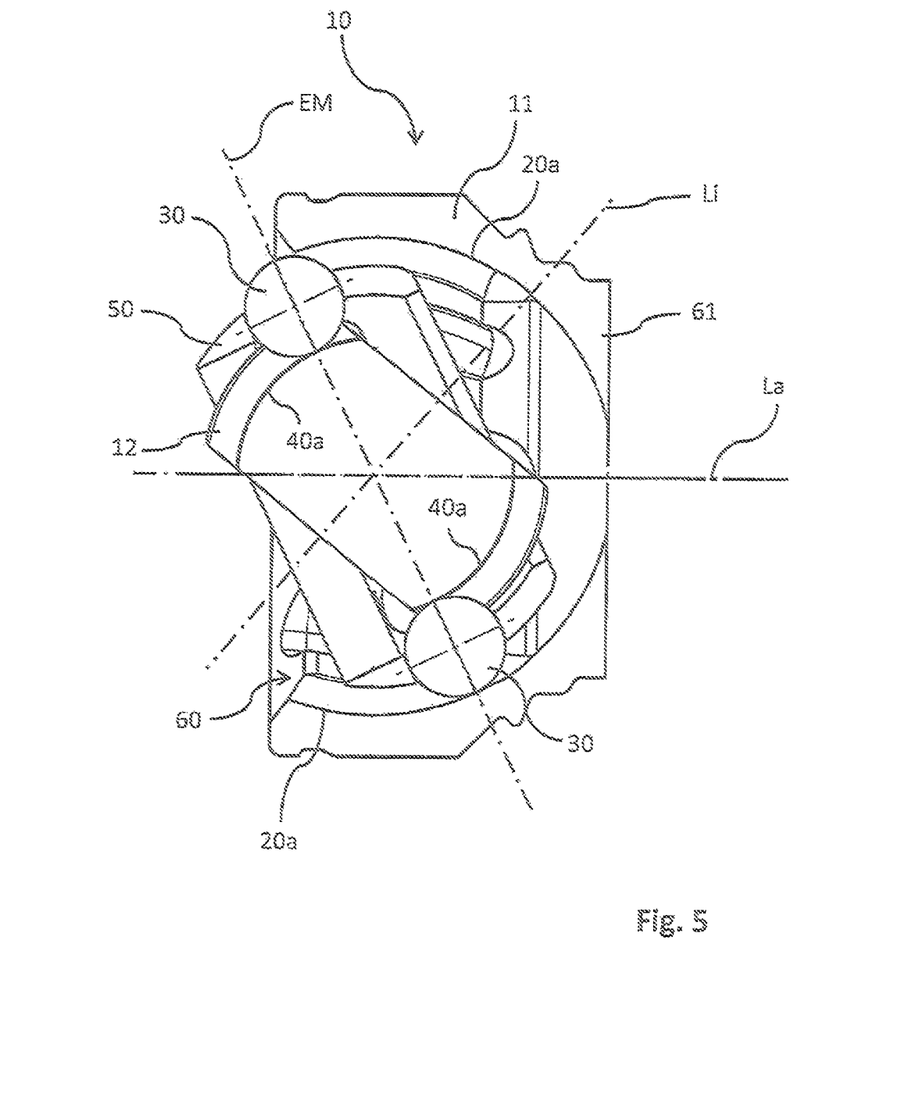
FIG. 5 shows a sectional view of the constant-velocity rotary joint according to FIG. 4 along section line A-A.

The balls 30, 31 are retained in a common ball cage 50, wherein the centers of the balls 30, 31 are retained in a common plane, the so-called joint center plane EM, which, when the joint is straight, is perpendicular to the first longitudinal axis La and the second longitudinal axis Li (see FIG. 2). If the joint 10 is bent, as shown in FIG. 5, the joint center plane EM corresponds to an angle-bisecting plane between the first longitudinal axis La and second longitudinal axis Li. In this case, a spherical outer surface 50 of the cage rests, with clearance, against a spherical inner surface of the outer joint portion 11, while a spherical inner surface of the cage 50 rests, with clearance, against a spherical outer surface of the inner joint portion 12, in order thus to enable the cage 50 to pivot freely between the two joint portions 11, 12.

Figure 3:
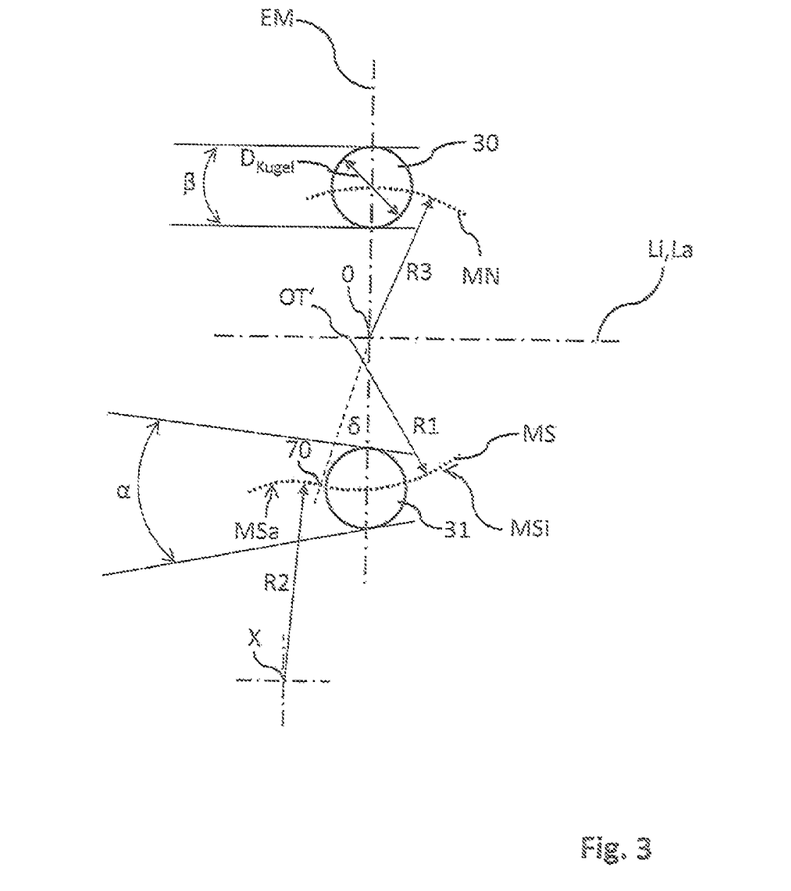
FIG. 3 shows a schematic representation of the configuration of center lines of two types of track pairs in a constant-velocity rotary joint according to FIG. 2.

The difference in design substantially characterizing the type of track pairs is to be illustrated based on the sectional view of FIG. 2 and the schematic depiction of FIG. 3, wherein the joint is in the straight position in each case, in which the first longitudinal axis La and the second longitudinal axis Li are aligned. For the sake of simplicity, but without limiting the disclosed embodiments thereto, it was assumed here that the balls 30, 31 in each case roll on a bottom line of the respective ball track and that thus, in the Figures, the course of the center lines MN, MS of the outer ball tracks determined by the ball center, offset by the ball radius in a parallel direction, corresponds to that of the respective track bottom line.

The configuration of the outer ball track 20a and the inner ball track 40a associated with the first type of track pairs is explained in more detail hereinafter with reference to FIGS. 2 and 3. The contact line associated with the outer ball track 20a of the first type and the center line MN extending parallel thereto are described by concentric circular trajectories whose circle center 0 is situated on the joint center plane EM in their intersection point with the first longitudinal axis Li and with the second longitudinal axis Li. For the track pairs of the first type, the opening angle β consequently is 0°. Due to the concentric circular course of the center line MN, this angle remains at an absolute value of 0° across the pivoting range. In other words, due to the curvature of the associated ball tracks 20a, 40a, balls 30 associated with this first type of track pairing are not subjected to axial forces, neither in the straight position, nor in the bent position of the joint 10.

Depending on the deflection of the joint, these balls 30 may also be subject to axial forces which, however, are caused by the structural shape of the joint and not by the specific curvature of their ball tracks and the resulting opening angle β. In the case of a bent joint, for example, axial forces act on balls in positions in which the outer and inner ball tracks intertwine.

FIG. 2 shows the radius R3a of the outer ball track 20a and the radius R3i of the inner ball track 40a of such a neutral track pairing with a concentric radius of curvature. In contrast, FIG. 3 only shows the center line MN of the outer ball track 20a and specifies its radius R3 towards the joint center point 0. In this embodiment, the neutral tracks are produced by a single radius R3 (R3i, R3a) disposed concentrically to the center 0 of the joint.

In the case of controlling track pairs of the second type with balls 31, the inner and outer ball tracks 20b, 40b, or their center lines, which describe the path of the balls, consist of at least two portions curved in opposite directions in this embodiment. However, the radius of curvature of the outer portion MSa may also be infinite, i.e. the center line MS widens in a linear manner through the outer portion MSa. In the embodiment of FIG. 3, the center of curvature OT' of an inner portion MSi of the center line MS of the outer ball track 20b is offset from the joint center plane EM, i.e. it is offset towards the opening side 60, preferably on the longitudinal axis La. The resulting radius R1 is specified. The center of curvature X of an outer portion MSa of the center line MS of the outer ball track 20b is situated outside the hollow volume of the outer joint part 11. In this case, it is also situated offset from the joint center plane EM, i.e. offset towards the opening side 60. The resulting radius R2 is specified.

FIG. 2 examines this with respect to the outer and inner ball tracks 20b, 40b, wherein the radius R1a and the radius R2a with the associated centers of curvature OT' and Xa are specified for the outer ball track 20b. This also applies to the inner ball track 40b with the radius R1i, the radius R2i and the associated centers of curvature OT" and Xi.

The opening angle α of the ball tracks for the controlled balls 31 and the opening angle β of the ball tracks for the neutral balls 30 are also apparent from FIG. 3. Moreover, FIGS. 2 and 3 illustrate that the tangential transition 70 between the curvature of the inner portion MSi and the curvature of the outer portion MSa is preferably relatively close to the opening 60. The angle δ between the joint center plane EM and a line between the joint center point 0 and this tangential transition or transition point 70 is preferably greater than 8°. In particular, it is between 16° and 18°, particularly preferably about 17°. The radii R1 and R2 are selected accordingly in order to cause as late a transition as possible.

Note that curve MS, shown in FIGS. 2 and 3, which is made up of sections MSa and MSi, represents the S-shaped curve of the second type of ball tracks, which is provided according to the present disclosure as further set forth in more detail hereinabove.

In one embodiment, the ratio of a curvature radius R1 of the inner portion MSi to the diameter $D_{Kugel}$ of an associated ball 31 is between 1.5 and 2.5, for instance. The ratio of a curvature radius R2 of the outer portion MSa to the diameter $D_{Kugel}$ of an associated ball 31 is between 1.0 and 10, for instance. Furthermore, the ratio of a curvature radius R3 of the center lines MN of the first type of track pairs to the diameter $D_{Kugel}$ of an associated ball 30 is between 1.5 and 2.5, for instance.

Figure 4:
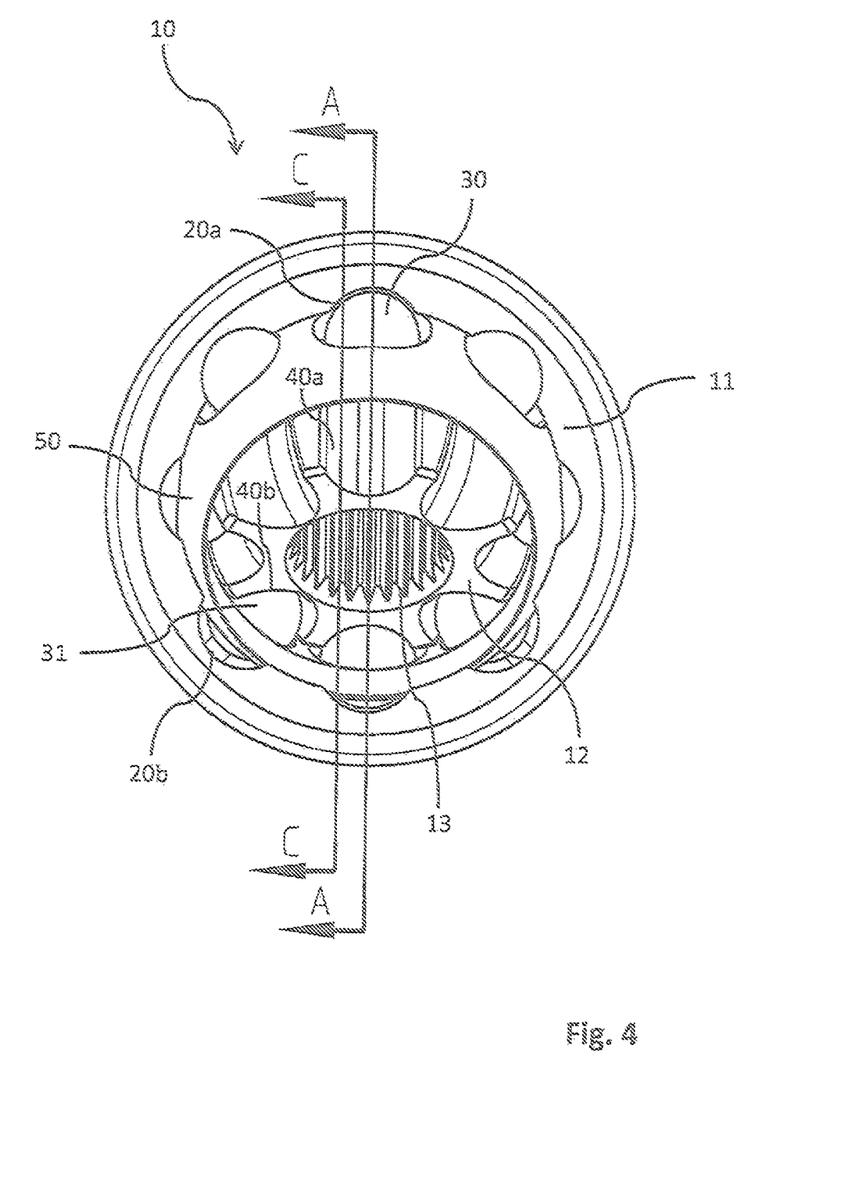
FIG. 4 shows a front view onto the opening side of the constant-velocity rotary joint of FIG. 1 in the bent position.
Figure 6:
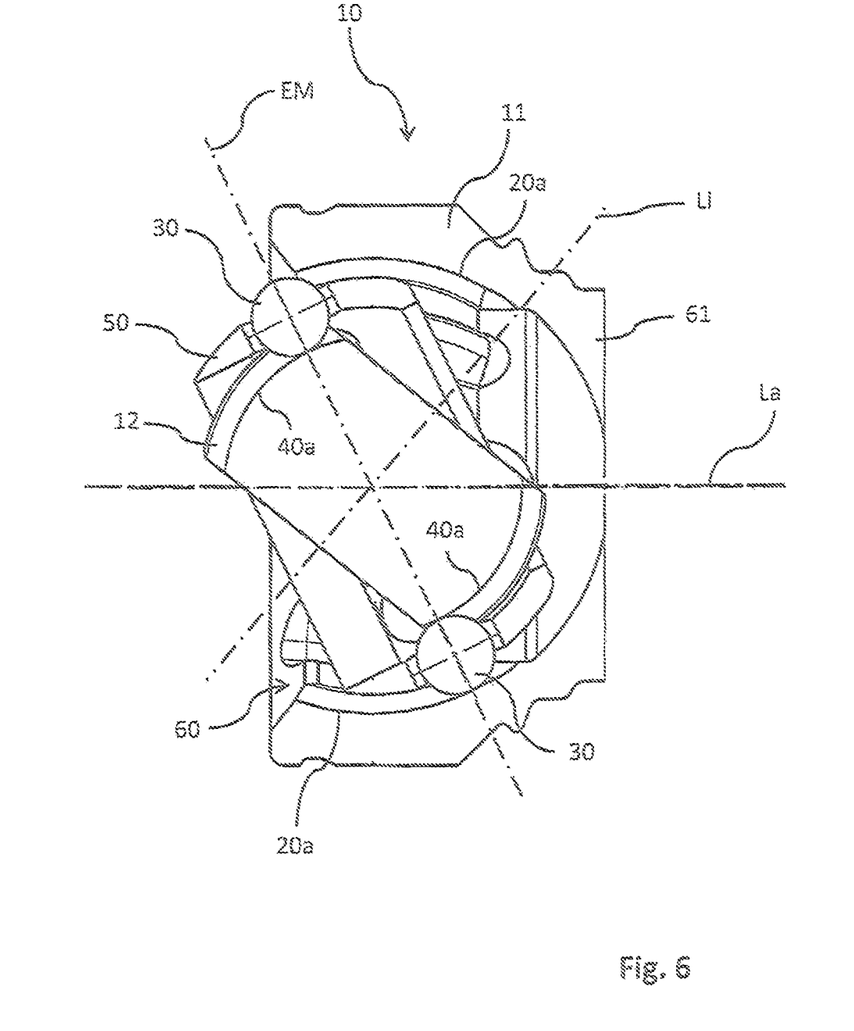
FIG. 6 shows a sectional view of the constant-velocity rotary joint according to FIG. 4 along section line C-C.

FIG. 4 shows a constant-velocity rotary joint according to FIG. 1 in a bent state. FIG. 5 shows the section A-A through the center of two neutral balls 30 situated opposite each other, while FIG. 6 shows the section C-C slightly offset through two neutral balls 30 situated opposite each other. In this case, it becomes clear that the neutral balls 30 are released early when the joint is bent to a great extent. However, this is acceptable due to the high number of balls remaining in engagement.

What is claimed is:

1. A constant-velocity rotary joint for torque transmission, comprising:
   an outer joint portion with several outer ball tracks,
   an inner joint portion with several inner ball tracks,
   torque-transmitting balls, which are each guided in track pairs of outer ball tracks and inner ball tracks, and
   a cage, which accommodates the torque-transmitting balls in circumferentially distributed cage windows and retains them in a common joint center plane when the constant-velocity rotary joint is straight,
   wherein the outer joint portion has a longitudinal axis and, situated axially opposite each other, an opening side and a connecting part, and paths of the centers of the torque-transmitting balls is in each case defined as a center line of the respective ball track, and
   a first type of track pairs of ball tracks is configured so that the centers of curvature of the center lines of the ball tracks are situated in the joint center plane when the joint is straight,
   while a second type of track pairs of ball tracks is configured so that their center lines have at least two portions, and the respective center line of the outer ball tracks of the second type of track pairs has at least one inner portion and one outer portion, wherein the inner portion is situated on a connection side of the outer joint portion, while the outer portion is situated on an opening side of the outer joint portion, and the inner portion is curved and a center of curvature of the inner portion, when the joint is straight, is situated within a hollow volume of the outer joint portion, offset from the joint center plane towards the opening side, while the center line of the outer ball tracks of the second type of track pairs widens through the outer portion towards the opening side.

2. The constant-velocity rotary joint of claim 1, wherein the center line of the outer ball tracks of the second type of track pairs widens in a linear manner through the outer portion.

3. The constant-velocity rotary joint of claim 1, wherein each of the at least two portions of the second type of track pairs of ball tracks are curved in opposite directions and the center of curvature of an outer portion of the at least two portions of the second type of track pairs of ball tracks is situated outside the hollow volume of the outer joint portion.

4. The constant-velocity rotary joint of claim 3, wherein the ratio of a curvature radius of the inner portion of the at least two portions of the second type of track pairs of ball tracks to the diameter of an associated ball is between 1.5 and 2.5.

5. The constant-velocity rotary joint of claim 3, wherein the ratio of a curvature radius of the outer portion of the at least two portions of the second type of track pairs of ball tracks to the diameter of an associated ball is between 1.0 and 10.

6. The constant-velocity rotary joint of claim 3, wherein the center of curvature of the outer portion of the at least two portions of the second type of track pairs of ball tracks is offset from the joint center plane towards the opening side.

7. The constant-velocity rotary joint of claim 3, wherein the at least two portions of the second type of track pairs of ball tracks form an S-shaped course that is defined by the curvature of the outer portion and the curvature of the inner portion.

8. The constant-velocity rotary joint of claim 7, wherein the longitudinal axis of the outer joint portion intersects the joint center plane at the joint center point and wherein the S-shaped course has a tangential transition point that is positioned between the curvature of the inner portion and the curvature of the outer portion with an angle δ between the joint center plane and a line between the joint center point and the tangential transition point that is greater than 8°.

9. The constant-velocity rotary joint of claim 8, wherein the angle δ is between 16° and 18°.

10. The constant-velocity rotary joint of claim 8, wherein the angle δ is substantially 17°.

11. The constant-velocity rotary joint of claim 1, wherein the ratio of a curvature radius of the center lines of the first type of track pairs to the diameter of an associated ball is between 1.5 and 2.5.

12. The constant-velocity rotary joint of claim 1, wherein an equal number of track pairs of both first type and second type is provided and the track pairs of the first type and the second type alternate.

13. The constant-velocity rotary joint of claim 1, wherein the number of torque-transmitting balls is at least eight.

* * * * *